April 9, 1963 F. A. BOZIO 3,084,816
SLIDABLE SUPPORT RACK
Filed Jan. 11, 1960 2 Sheets-Sheet 1
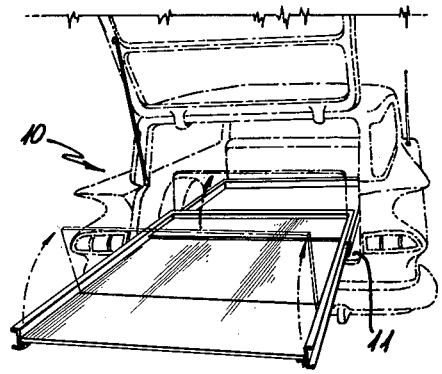
FIG_1
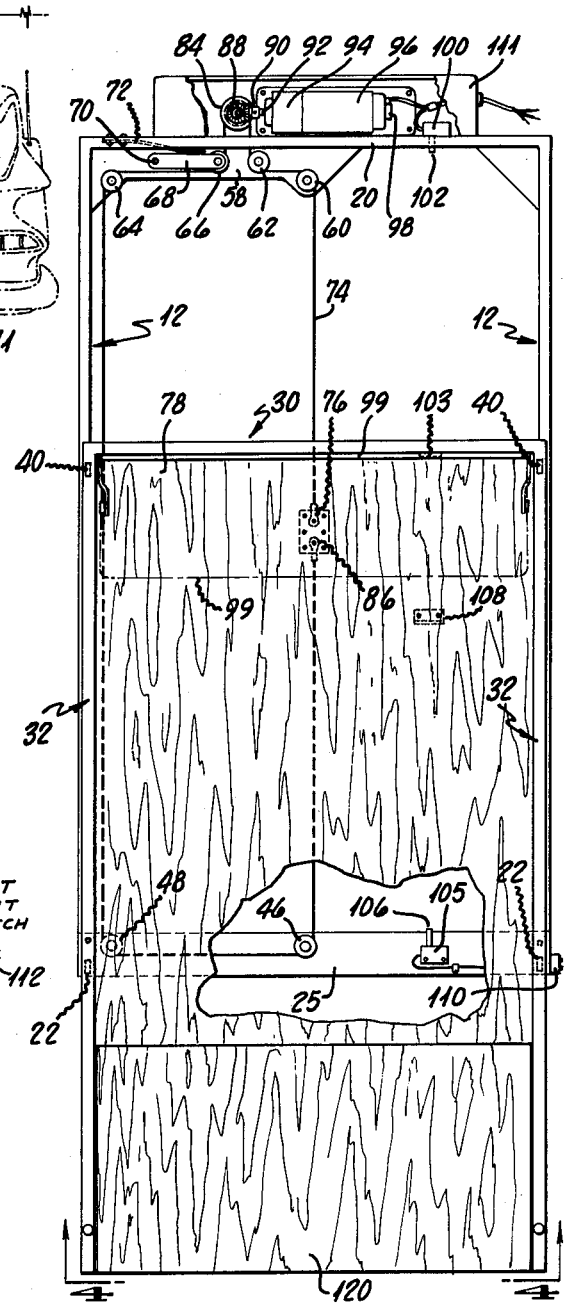
FIG_2
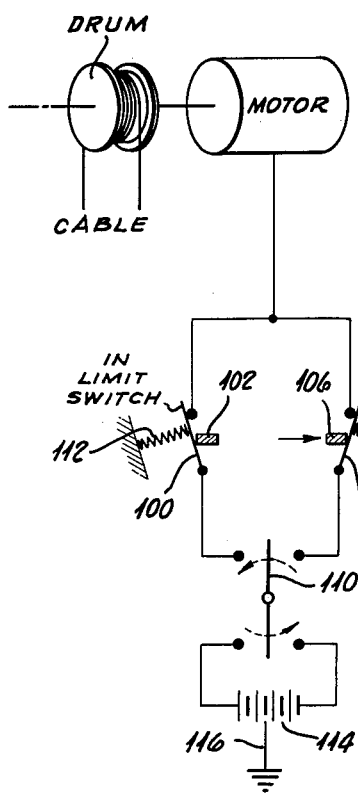
FIG_6
INVENTOR.
FRANK A. BOZIO
BY Christie Parker & Hale
ATTORNEYS April 9, 1963
F. A. BOZIO
3,084,816
SLIDABLE SUPPORT RACK
Filed Jan. 11, 1960
2 Sheets-Sheet 2
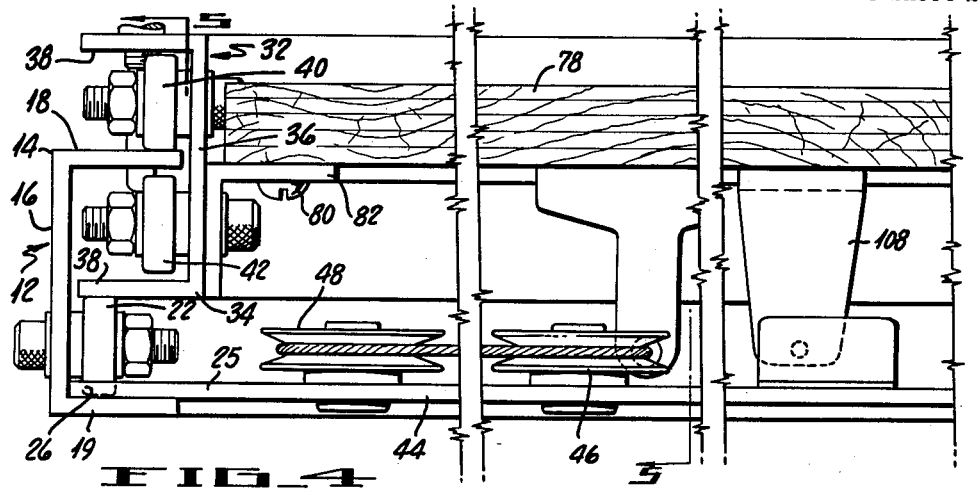
FIG_4
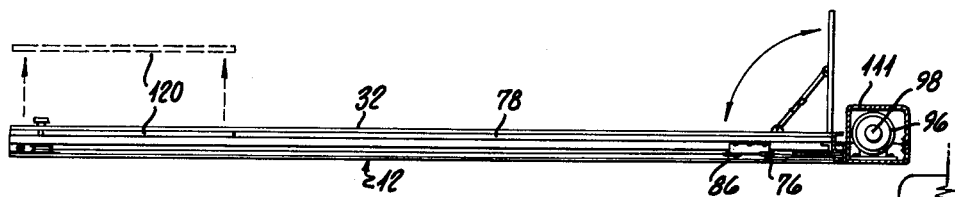
FIG_3
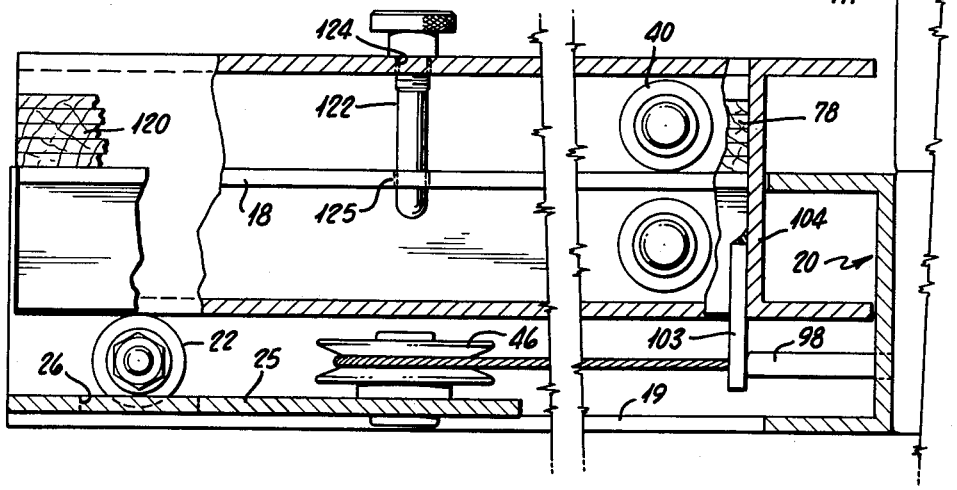
FIG_5
INVENTOR.
FRANK A. BOZIO
BY
Christie Parker & Hale
ATTORNEYS

United States Patent Office 3,084,816
Patented Apr. 9, 1963

3,084,816
SLIDABLE SUPPORT RACK
Frank A. Bozio, 375 Oakwood Blvd. W.,
Redwood City, Calif.
Filed Jan. 11, 1960, Ser. No. 1,757
1 Claim. (Cl. 214—83.24)

This invention relates to a slidable support rack adapted to be mounted in, and slide in and out of the back of a vehicle such as a panel truck, station wagon, and the like.

Panel trucks and station wagons are often used by salesmen and tradesmen to carry materials such as goods, samples, equipment, etc. With many vehicles, particularly the more recent styles, which are built with relatively low lines, it is difficult for a person to have ready access to the space inside a panel truck or station wagon. Consequently, it is often necessary to resort to the awkward procedure of climbing over goods or equipment in order to reach the interior of the vehicle.

This invention provides a rack adapted to slide in and out of the back of a vehicle and support on it material normally carried in the vehicle. In effect, this invention makes the floor of a vehicle, which opens at its rear, slidable longitudinally so that a person has ready access to any part of the storage space in the vehicle. The invention eliminates the necessity of climbing into a narrow confined space packed with goods or equipment, and facilitates handling of material carried in the vehicle.

Briefly, the invention contemplates a pair of horizontally spaced elongated tracks disposed on the floor of the back of a vehicle adapted to open at its rear. The tracks extend in the same general direction as the longitudinal axis of the vehicle. A slidable frame is mounted on the track to slide in and out of the back of the vehicle between a forward and a rear position. A cover is mounted on the frame to support material to be carried by the rack.

In the preferred form of the invention, at least the rear portion of the cover is removable to permit access to the rear end of the vehicle floor with the frame in the forward position. This feature permits removal of the spare tire ordinarily carried by most vehicles under the rear part of the floor of the vehicle, without having to remove the entire support rack.

In another form of the invention, power means are provided for moving the frame in and out of the vehicle, and locking it against movement in intermediate positions between the forward and rear positions. This form of the invention also includes limit devices for stopping the frame in the forward and rear positions. Means are also provided for interlocking the frame to the track so the frame can be cantilevered a substantial distance out the back of the vehicle.

These and other aspects of the invention will be more fully understood from the following detailed description taken in conjunction with the accompanying drawings, in which:

FIG. 1 is a perspective view of the rear of a vehicle in which the rack is mounted;

FIG. 2 is a plan view of the rack mounted in the vehicle with the frame about one-third of the way out of the vehicle;

FIG. 3 is a side elevation of the rack in the forward position;

FIG. 4 is a view taken on line 4—4 of FIG. 2;

FIG. 5 is a view taken on line 5—5 of FIG. 4; and

FIG. 6 is a schematic circuit diagram of the controls for moving the rack in and out of the vehicle.

Referring to FIG. 1, a vehicle such as a panel truck 10 is constructed to open at its rear, and provide access to an elongated horizontal floor 11 which extends in the direction of the longitudinal axis of the vehicle.

A pair of horizontally spaced tracks 12 are mounted on opposite sides of the vehicle floor to extend parallel to the longitudinal axis of the vehicle. The tracks are identical in construction, and as shown best in FIG. 4, are each a channel piece 14 which includes a vertical web 16 and inwardly extending upper and lower flanges 18 and 19, respectively. The tracks are connected at their inner or forward ends by a channel cross piece 20.

A separate stationary roller 22 is mounted at the rear end of each track on respective inwardly extending horizontal axles 24 secured to the web 16 of the tracks. A transverse horizontal rear plate 25 is secured to the lower flanges of the track at the rear end of each track. A separate longitudinal groove 26 in the upper surface and at each end of the rear plate receives the lower portion of a respective stationary roller.

A frame 30 is mounted to slide in the channels of the tracks on the stationary rollers. The frame includes a pair of elongated and laterally spaced side members 32, each of which is an outwardly opening channel piece 34 having a vertical web 36, and outwardly extending upper and lower flanges 38, 39, respectively, which interlock with the upper flange 18 of a respective track as shown best in FIG. 4.

A separate upper traveling roller 40 is mounted on the outside of each side member at the forward end of a respective web 36. Each upper traveling roller rides on the upper flange of a respective track.

A separate lower traveling roller 42 is mounted on each side member directly below a respective upper traveling roller. Each lower roller is a slight distance below the upper flange of each respective track. The lower rollers move up to engage the underside of the upper flange of the track when the frame is moved so far out of the vehicle that its center of gravity is to the rear of the stationary rollers 22.

The rear plate 25, which is connected to the bottom flanges across the rear ends of the tracks, carries a central pulley 46 at its center and an outer pulley 48 at its left end, each pulley being mounted above the rear plate to rotate about a vertical axis.

A transverse forward plate 58 is secured to the front end of the left track, and extends to slightly past the center of the front cross piece 20, to which it is secured. The forward plate carries a central pulley 60 at its right end, an intermediate idler pulley 62 just to the left of of the central pulley 60, and an outer pulley 64 located at the left end of the front plate. Each of the idler pulleys is disposed above the forward plate and mounted to rotate about respective vertical axes. A tension pulley 66 is mounted on the inner end of a transverse pivot arm 68 to rotate about a vertical axis above the forward plate just to the left of intermediate roller 62. The opposite end of the pivot arm 68 is secured by a vertical pivot pin 70 to the forward plate. A leaf spring 72 is connected to the forward cross piece, and engages the pivot arm to urge it in a clockwise direction as viewed in FIG. 2 to maintain a constant tension in a cable 74 which is secured at one end 76 to the underside of a horizontal cover 78 fastened by screws 80 (see FIG. 4) to the top side of an angle bracket 82 mounted on the inside of respective webs of the side pieces of the frame. The cable extends around the pulleys as shown in FIG. 2, and around a drive drum 84 mounted forward of the front cross piece to rotate about a vertical axis. The opposite end 86 of the cable is secured to the cover 78 adjacent the first end 76. The drum includes a driven bevel gear 88 which meshes with a driving bevel gear 90 secured to a horizontal shaft 92 of a gear reduction box 94 driven by a reversible electrical motor 96, which includes conventional zero limit stop means 98 to lock the motor against turning when it is not energized. An in-limit switch 100 is mounted on the cross piece of the track and carries an actuating button 102 adapted to be engaged by a downwardly extending plate 103 attached to a front cross piece 104 of the frame when the frame is in its most forward position. An out-limit switch 105 is mounted on the rear plate and carries a button 106 adapted to be engaged by downwardly extending plate 108 mounted on the bottom of the cover. A master switch 110 is mounted on the rear end of the right hand track. A case 111 is secured to the front cross piece 20 of the track to enclose the motor, gear box, driving and driven gears, the drum, and the in-limit switch.

The in-limit switch, out-limit switch, and master switch are connected as shown in FIG. 6. Each of the limit switches includes a spring 112 urging it to a closed position. The master switch is adapted to connect the in-limit switch to the negative terminal of a battery 114, which is grounded at a center tap 116, or to connect the out-limit switch to the positive terminal of the battery.

The operation of the apparatus is as follows. Assuming that the frame is all the way in the vehicle, and it is desired to withdraw the storage rack, the master switch is rotated clockwise (as viewed in FIG. 6) until the positive terminal of the battery is connected to the motor through the out-limit switch 105, which is held closed by its spring 112. The motor turns to cause the drum to rotate in a clockwise direction (as viewed in FIG. 2) so that the frame is pulled out of the vehicle. Movement of the frame outwardly continues until the switch is set in the neutral position shown in FIG. 6, or until the limit plate 108 on the bottom of the cover engages the button 106 of the out-limit switch and forces it open. This automatically locks the motor and frame in the rear position. To return the frame, the master switch is rotated counterclockwise (as viewed in FIG. 6) until the negative terminal of the battery is connected to the motor through the in-limit switch, which is now closed by its spring 112. The motor now turns in the opposite direction so that the drum is rotated in a counterclockwise direction (as viewed in FIG. 2) and the frame is pulled back into the vehicle until the master switch is set to the neutral position shown in FIG. 6, or until the in-limit switch is opened by contact with the frame.

The cover includes a transverse rear section 120 which is separate from the remaining portion of the cover so that the rear portion can be lifted up, as shown in phantom line FIG. 1, or removed entirely, as shown in phantom line in FIG. 3, to permit access to the floor area at the rear end of the vehicle. This is desirable because most vehicles carry a spare tire at this location, and it is often necessary to be able to remove the spare tire without having to take the frame out of the vehicle.

The forward end of the cover includes a transverse section which is hinged at its forward edge to the cross member of the frame so that it can be pivoted upwardly as shown in phantom line in FIGS. 1 and 3. This arrangement permits access to the floor under the forward end of the vehicle, and also provides a "buckboard" to protect the front seat and driver from loose material being thrown forward in case the vehicle stops suddenly.

A downwardly extending separate locking pin 122 is externally threaded to screw into an internally threaded hole 124 in the rear end of the upper flange of each side piece of the frame. When the frame is in the forward position, each pin is screwed to fit into a respective hole 125 in the rear end of a respective upper flange of the track so the frame is positively locked against movement. When the frame is to be moved, the pins are turned until their respective lower ends clear the holes in the track flanges.

I claim:

A support rack adapted to slide in and out the back of a vehicle such as a panel truck, station wagon and the like, the rack comprising a pair of substantially horizontal and laterally spaced elongated tracks disposed on opposite sides of the floor of the back of the vehicle and extending in the same general direction as the longitudinal axis of the vehicle, a separate track roller mounted at the rear end of each track to be rotatable about transverse axes, an elongated slidable frame disposed on the rollers to roll over them in a longitudinal direction between a forward and a rear position, a separate frame roller mounted on each side of the frame forward of the track rollers to roll on the track and support the forward end of the frame, and a cover mounted on the frame to support material, at least the rearmost portion of the cover being removable to permit access to the rear end of the vehicle floor with the frame in the forward position.

References Cited in the file of this patent

UNITED STATES PATENTS

| | | |
|---|---|---|
| 655,522 | Seaver et al. | Aug. 7, 1900 |
| 1,629,403 | Marwahn | May 17, 1927 |
| 1,778,510 | Richardson | Oct. 14, 1930 |
| 2,091,070 | Girl | Aug. 24, 1937 |
| 2,284,419 | Greig | May 26, 1942 |
| 2,391,310 | Heller | Dec. 18, 1945 |
| 2,576,385 | Bigsby | Nov. 27, 1951 |
| 2,631,886 | Keller | Mar. 17, 1953 |
| 3,006,487 | Gelli | Oct. 31, 1961 |